Dec. 23, 1952   J. F. JORDAN   2,622,862
MELTING FURNACE
Filed March 5, 1951
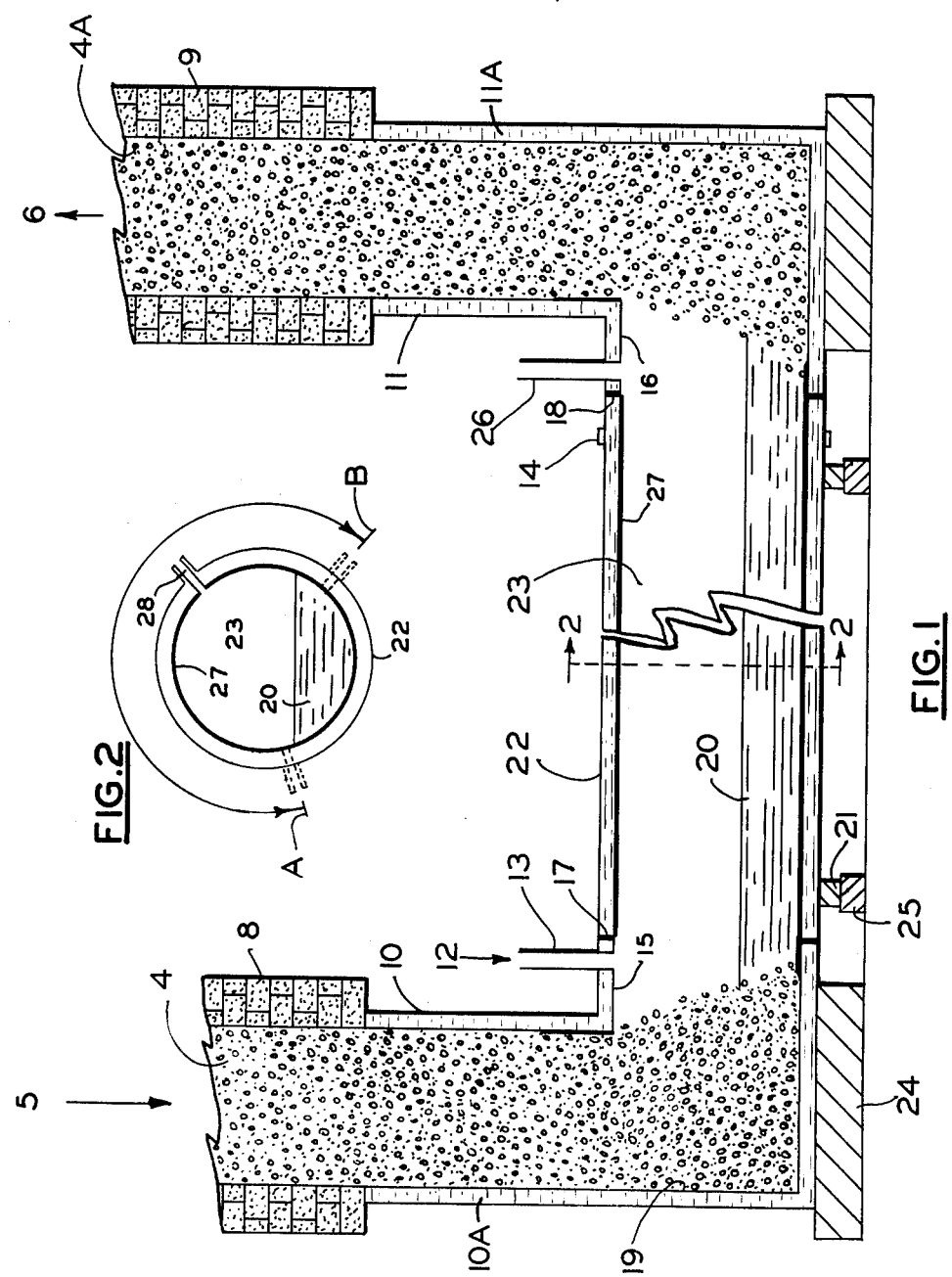
INVENTOR:-
James Fernandes Jordan Patented Dec. 23, 1952

2,622,862

UNITED STATES PATENT OFFICE 2,622,862

MELTING FURNACE

James Fernando Jordan, Huntington Park, Calif.

Application March 5, 1951, Serial No. 213,906

1 Claim. (Cl. 263—16)

My invention relates to the art of melting high-melting-point materials.

Figure 1 shows a cross section of my melting furnace.

Figure 2 shows section 2—2, indicated in Figure 1.

In my copending application, Serial No. 26,100, filed on May 10, 1948, now matured into Patent No. 2,544,091, I disclosed my melting process wherein two loosely-packed columns of the material that is to be melted are employed to accumulate the waste heat from and to return said accumulated waste heat to the combustion chamber that connects said columns at their bases. As the waste heat from the combustion chamber is accumulated in one of the columns by passing the waste gases from said chamber up thru said column, the other column is being employed to preheat the air that is to be employed in combustion reactions within the combustion chamber. The fuel is mixed with the preheated air after said preheated air has emerged from the base of the preheating column and has entered the combustion chamber, and the combustion is carried out so that the combustion reactions are substantially completed within said chamber and out of contact with unmelted material that is to be melted. With the melting operation always taking place at the base of the column that is accumulating the waste heat, the functions of the two columns are reversed as often as necessary to maintain the melting rate. In carrying out the combustion process so that the combustion gases do not contact any substantial amount of unmelted material before the combustion reactions are substantially completed, substantially the entire energy content of the preheated air and fuel is available to the melting process. Reference should be made to Serial No. 26,100 for further details regarding the melting process.

The available heat in any combustion-type melting process is that portion of the heat content of the hot gas that is capable of supplying the heat of liquation to said material. If, for example, the melting point of the material is, say, 2600° F., the hot gas will liquate said material so long as the temperature of said gas lies at or above said 2600° F., and the heat content of said gas after it will no longer liquate said material is heat that is not available to the melting process; that the heat which will not liquate said material is available for preheating said material is not a pertinent matter, for, in a combustion process of this type, there is never a lack of heat that is available to the preheating process. It is the presence of available heat in the hot gas that makes a melting process feasible in the first place, and it is the amount of available heat present in the hot gas that determines the efficiency of the melting process.

Unfortunately, a high percentage of available heat is directly reflected in the temperature of the hot gas. If the available heat content of the hot gas is relatively low, as in the open hearth wherein about 45% of the energy input is available for liquating steel, the flame temperature is low enough to be conveniently retained by means of available refractories; that is, under combustion arrangements wherein the available heat content of the hot gas is relatively low, the flame temperature is low enough to avoid any extensive melting of the silica roof. In other words, the open hearth process is feasible only because the combustion process is inefficient; for, if the available heat content of the open hearth process is raised appreciably, the silica roof will melt.

In a melting process of the type disclosed in Serial No. 26,100, the available heat content of the hot gas may reach, say 80%, and the temperature of the hot gas will reach enormous heights. Accordingly, it becomes vitally important to devise a method of retaining a hot gas of this type, for conventional refractories would not long stand up in the face of the temperatures to be encountered within the combustion chamber of such a process. I have solved this problem of how to retain the high temperature heat released by my melting process. My solution involves the use of a rotating combustion chamber that is a water-jacket, so that the material that has been melted forms a solidified layer that covers the entire inner surface of the revolving combustion chamber, so that the material that has been melted acts as the refractory within the combustion chamber.

In Figure 1, loosely-packed column 4 is shown retained by refractory brick 8 and water-jacket 10, and loosely-packed column 4A is shown retained by refractory brick 9 and water-jacket 11. Jackets 10 and 11 are cooled by water 10A and 11A. Water-jackets 10 and 11 are extended horizontally from their bases to form extensions 15 and 16, said extensions 15 and 16 being axial with and of substantially the same diameter as water-jacket combustion chamber 22 at the points whereat static elements 15 and 16 reach out far enough to form a seal with dynamic element 22. Seals 17 and 18 may be formed in a number of ways; I prefer the arrangement wherein a preselected clearance is established between static elements 15 and 6 and dynamic element 22, and then depending for a seal therebetween upon the plastic properties of the bath 20 of melted material, for said melting material 20 will run into the gap between elements 15 and 16 and element 22 when element 22 revolves to periodically submerge all of said gap(s) beneath bath 20. While some molten material 20 may on occasion run thru the seals to escape from bath 20, this need not necessary be a hardship. Ordinarily, the amount of molten material 20 that will escape from the molten bath will not amount to much if the gaps are narrow, due to the severe cooling action of the water-jackets in the vicinity of gaps or seals 17 and 18 on the viscosity of molten material 20.

Figure 2 shows the rotation pattern of element 22, said pattern being designed to periodically immerse all of the inner surface of chamber 22 beneath molten bath 20, so as to maintain layer 27 thereupon. Opening 28 is the opening out thru which molten material 20 flows as it leaves chamber 22 when said chamber 22 is in position B; position A being the maximum degree of rotation permissible under the circumstance shown in Figure 2 when it is desired to tap molten material 20 out of chamber 22 on just one side of chamber 22. If desired, chamber 22 may be continuously rotated all the way around, instead of from position A to position B and back; however, in that case, the molten material 20 may flow out of chamber via spout 28 during the passage of opening 28 under bath 20—I may prevent the escape of melting material 20 during the immersion of opening 28 beneath bath 20 by simply inserting a plug into opening 28.

The rotation of chamber 22 may be accomplished by those methods conventional with the rotary kiln type of furnace. In the event that the rotation pattern of Figure 2 is to be employed, the means for rotation must contain a mechanism whereby the rotation is reversed at the preselected positions—that is, position A and position B. Figure 1 shows chamber 22 mounted on bearings 21, which, in turn, are shown supported by means 25, means 25 being a track. Drive gear 14 is shown mounted around chamber 22, said means 14 being connected to a drive mechanism (not shown) that imparts the desired rotation pattern to chamber 22.

In operation, my furnace functions in the following manner: with air 5 being preheated during its passage down thru column 4, I add the fuel 12 thru fuel port 13, causing the resulting combustible mixture to burn as it passes thru combustion space 23. With the hot gas at its maximum energy content, I cause the hot gas to plunge into the base of column 4A, thereby melting the material lying at said base, the melted material being thereupon caused to flow into chamber 22 to collect in pool 20. The waste heat from the melting operation at the base of column 4A passes on up thru column 4A, imparting thereto the energy required to preheat column 4A to its melting point. The waste gas leaves the process as gas 6.

When the melting operation at the base of column 4A has slowed down to a point that indicates the desirability of reversing the regenerative system, the flow of air 5 down thru column 4, and the addition of fuel 12 via port 13, is stopped, and the system is reversed by introducing air 5 by passing it down thru column 4A and adding fuel 12 to the preheated air 5 via port 26. Such regenerative reversals are repeated as often as necessary to maintain the melting rate.

As may be seen in Figure 1, the entire combustion and melting zone within my process is water-jacketed to the end that only bare water-jackets are exposed to the energy being released within chamber 22. The cooling effect of the bare water-jackets is greatly minimized by layer 27 within chamber 22 and by the unmelted material that is lying at the base of the columns in a manner that protects backwalls 19. Only the upper portion of extensions 15 and 16 lie completely exposed to the hot gas. The cooling effect of vertical water-jackets 10 and 11 will be slight, due to the tendency of the hot gases to flow thru the center of the charges.

Vertical water-jackets 10 and 11 form the melting zones of my process. There is no need to extend jackets 10 and 11 much above the actual melting zones; in any case, the conservation of heat suggests that non-metallic refractories be substituted for jackets 10 and 11 as soon as the temperature of the upflowing gas has fallen to temperatures which may be entertained within available non-metallic refractories. Figure 1 shows the upper portion of columns 4 and 4A to be formed by refractory means 8 and 9.

While the shape and size of extensions 15 and 16 should conform to the shape and size of the ends of chamber 22 at the points whereat a sliding junction is made therebetween, the shape and size of the spaces formed within and by the vertically and horizontally-disposed water jackets may be any convenient arrangement. For example, while the sides of chamber 22 are shown to be parallel, they need not necessarily be so—they may, for example, be bellied out at the center of chamber 22, so as to increase the holding capacity of chamber 22.

The distance that static members 15 and 16 extend horizontally out from jackets 10 and 11 will depend upon a number of things; for example, the angle of recline of the unmelted material lying at the bases of the columns; however, it should be pointed out that there is no reason why the arrangement regarding the recline angle in Figure 1 should be adhered to; that is, the angle of recline may be such that unmelted material extends past seals 17 and 18 to enter revolving chamber 22 before it actually melts and flows thereinto.

Towers 8 and 9, together with the loosely-packed material that they contain, are heat exchangers for the melting and accumulation process that takes place at the melting zones and within the combustion chamber, and, accordingly, towers 8 and 9 containing the loosely-packed columns will be referred to as heat exchangers in my claims.

Having now described several forms of my invention, I wish it to be understood that my invention is not to be limited to the specific form or arrangements of parts hereinbefore described, except insofar as such limitations are specified in the appended claim.

I claim as my invention:

In a regenerative melting furnace having two mazes formed of the material that is to be melted and a connecting combustion chamber, water-jackets containing the base of each of said mazes; lateral extensions of and at the base of said water jackets to from conduits which are aligned axially with each other; inlets penetrating into the top of said conduits; a rotatable, water-jacket combustion chamber connecting and aligned with said extensions, the connection between said extensions and said chamber being loose enough to permit said chamber to rotate around its axis; and an outlet penetrating the wall of said chamber, so that the melting processes at the base of said mazes and the melted material that accumulates within said chamber contact only water-jackets within said furnace.

JAMES FERNANDO JORDAN.

REFERENCES CITED

The following references are of record in the file of this patent:

UNITED STATES PATENTS

| Number | Name | Date |
|---|---|---|
| 166,757 | Eustis | Aug. 17, 1875 |
| 166,977 | Eustis | Aug. 24, 1875 |
| 475,398 | Heckert et al. | May 24, 1892 |
| 688,651 | Kirk | Dec. 10, 1901 |
| 939,817 | Edison | Nov. 9, 1909 |
| 1,724,783 | Smallwood | Aug. 13, 1929 |
| 2,046,419 | Tourville | July 7, 1936 |
| 2,198,870 | Gohre et al. | Apr. 30, 1940 |